Patented Apr. 20, 1948

UNITED STATES PATENT OFFICE 2,439,807

TREATMENT OF ROSIN

Arthur W. Hixson, Leonia, N. J., and Ralph Miller, New York, N. Y., assignors to The Chemical Foundation, Incorporated, a corporation of Delaware, as trustee No Drawing. Application May 14, 1941, Serial No. 393,481

16 Claims. (Cl. 260—108)

This invention relates to the treatment of rosin, more particularly to a novel method of fractionating and refining rosin.

The present application is a continuation in part of prior application Serial No. 264,780, filed March 29, 1939, now U. S. Patent 2,247,496.

As is known, there are two principal types of rosin, namely gum rosin and wood rosin. The gum rosin is derived from oleoresinous gum obtained by scarifying the living pine tree. The wood rosin is obtained from pine stumps. A third source of rosin is tall oil, which comprises a mixture of rosin acids, fatty acids and non-saponifiable material.

Generically considered, rosin consists essentially of a mixture of isomers of rosin acids. While the actual chemical composition of the rosins is not too well known, nevertheless there are definite differences in the gum and wood rosins which are evident in certain chemical and physical constants. The wood rosin is of a low grade on the rosin scale and is characterized by a reddish tint not found in gum rosins. Since the value of rosin for many applications is increased by lightening the color, it is the usual practice to refine wood rosin to improve its color. Gum rosin and likewise tall oil rosin is sometimes treated to decrease its color.

There are several methods of refining rosin which have been utilized. One of these consists in dissolving the rosin in a low boiling petroleum fraction, i. e. a low boiling naphtha. The naphtha solution is then treated with a selective solvent, such as furfural which has a greater affinity for the color bodies than rosin. Another method consists in dissolving the rosin in a low boiling naphtha and contacting the solution with an adsorbent, such as fuller's earth or activated carbon. A third method, employed with tall oil rosin, comprises a vacuum distillation of the rosin.

Such prior methods present certain objections first among which is the fact that a rosin having a color equal to grade X is the best that can be produced. In such prior methods the basis of the treatment was the attempted segregation of a fraction consisting of the rosin acids and one comprised of the color bodies.

As a result of considerable experimentation in this field it has been found that by a method that is as simple as it is effective, very light colored rosin, i. e. improved grades of rosin, may be produced from the different rosin source materials. A unique feature of the novel method is the possibility of actually fractionating rosin into several fractions of definite gradations of color values. This type of fractionation is in sharp contradistinction to the prior refining methods in which, so to speak, the whole rosin content was attempted to be segregated from the color bodies. It is thus possible, under the present invention, to produce rosin fractions lighter than grade X if desired.

The present invention is based upon the discovery of unique and unexpectable effects which obtain in a liquefied, normally gaseous hydrocarbon-rosin system by modification of the temperature. Liquefied, normally gaseous hydrocarbons, such as propane, have the ability to dissolve rosin and some of the color bodies that are normally present in rosin. Attempts have been made in the past to utilize this fact to separate color bodies from rosin but only to the extent that the color bodies are relatively insoluble and the rosin is relatively soluble in the solvent. This is to say that prior to the present discovery the decolorizing of rosin by means of solvents, such as propane, was predicated upon the assumption that rosin was substantially completely soluble in the solvent. It has been discovered, however, contrary to prior postulates, that when solutions of rosin in liquefied, normally gaseous hydrocarbons are warmed some of the material comes out of solution in a lower immiscible second liquid phase. It has been discovered further that the solubility of the color bodies which are dissolved in the stated solvents decreased much more rapidly than the solubility of the rosin acids. The present process is based upon these two hitherto unknown facts and in a word comprise the refining and fractionation of crude rosin by dissolution in a liquefied, normally gaseous hydrocarbon and then the controlled insolubilizing of predetermined constituents by a thermal control of the system.

In actual mechanism the process consists in dissolving the rosin to be clarified and/or fractionated in a liquefied, normally gaseous hydrocarbon, such as propane, warming the resultant solution to effect the precipitation of certain constituents of the dissolved phase to form a lower immiscible second liquid phase, then separating the two phases and removing and recovering the solvent associated with each phase. As a result of this treatment the original rosin is divided into two fractions. The rosin which was dissolved in the liquefied, normally gaseous hydrocarbons is considerably lighter in color than the original rosin. The rosin which was in the lower precipitated phase is darker than the original rosin. By repetition of this treatment, i. e. by utilizing the same solvent and by elevating its temperature, a second phase separation may be effected in which darker colored components are precipitated in one phase and lighter colored components are retained in solution in the other phase.

With this type of sequential elevation of temperature it will be appreciated that it is thus possible not only to refine rosin (in a conventional sense of removing color bodies) but also to fractionate it. The process of fractionation may be continued to any desired degree by the method described, namely by continuously retreating the phase consisting of the rosin dissolved in the solvent by the simple expedient of elevating the temperature and effecting the formation of a second phase containing materials precipitated or insolubilized by elevation of the temperature. It has been found in actual practice that after the second sizable rosin phase, i. e. the second precipitated phase, has been removed few if any color bodies will be dissolved in the liquefied, normally gaseous hydrocarbon.

In carrying out the invention propane is the preferred liquefied, normally gaseous hydrocarbon although it is clearly to be understood that other liquefied, normally gaseous hydrocarbons or mixtures thereof can be utilized. When other such liquefied, normally gaseous hydrocarbons or mixtures thereof are employed it will be understood that the particular temperature employed for phase formation will be varied correspondingly. The advantage of propane over the other saturated, liquefied, normally gaseous hydrocarbons resides in the fact that the entire process can be carried out readily in the approximate temperature range 0° C. to 100° C. Propane also presents the advantage of being able to dissolve a substantial quantity of rosin without dissolving a large amount of color bodies. Ethane has only a small dissolving capacity for rosin so that if this is used alone very large quantities of ethane must be circulated per pound of rosin refined. Butane and isobutane dissolves rosin in adequate amounts but they also more readily dissolve the color bodies than does propane. A mixture of ethane and butane, for example, can be used to substantially duplicate the results obtained with propane.

As will be appreciated by those skilled in the art, the ratio of solvent to rosin which is utilized will depend upon the particular solvent employed. When propane is used, from 10 to 20 parts of solvents to 1 part of rosin, by weight, is suitable. As will have been appreciated, the temperature to which solvent is heated will depend upon the quality of the rosin that is desired. In a typical example, i. e. using propane as the solvent and "N" grade gum rosin, a temperature of about 70° C. will insure the production of a rosin fraction having a color which will grade about X and probably higher. In accordance with the invention, by operating at the higher temperatures lighter colored rosin products may be secured and the higher the temperature to which the solution is warmed the lighter will be the color of the product recovered with, naturally, a decrease in the yield.

It will be appreciated that the present process is essentially a thermal separation process operating in a solvent medium. In these circumstances, it is apparent that the lower phase may be retreated to secure a greater yield of light colored rosin, that is to say, the lower phase, after separation, may be refractionated in accordance with the principles of the invention. The process may be conducted as a batch process or preferably it may be effected in a continuous counter-current extraction system.

The present process presents potentialities not inherent in earlier methods. For example, rosin is frequently employed under conditions where it is advantageous to have it in finely divided form. Such finely divided form may readily be secured in the present method. If the liquefied, normally gaseous hydrocarbon containing the dissolved rosin is discharged into a chamber maintained at about atmospheric pressure and at a temperature above the normal boiling point of the solvent, the solvent rapidly volatilizes and rosin in the form of small frangible fragments is produced. The volatilization of the solvent refrigerates the solid phase rosin so that its tendency to melt and adhere to contiguous particles is greatly diminished. The solid particles thus produced may be subjected to a vacuum to remove some of the occluded gas. Rosin formed in this manner is very white in color, presents a large bulk for a given weight and is very reactive, dissolving in the rosin solvents very rapidly. Such a method presents marked advantages over earlier attempts to produce rosin in small particle phase. Such earlier attempts comprise an ordinary grinding operation but the frictional heats generated during grinding make the rosin particles sticky. In order to obviate this difficulty rosin has been ground in the presence of about 10% of bentonite. While this method does improve the grinding operation it eventuates in a product which contains an inert diluent. As compared to such prior methods the improved method of producing the rosin in finely divided form presents marked advantages.

It will be seen that the process of producing and refining rosin described herein represents a real advance. By utilization of the process, improved grades of rosin characterized by an extremely light color are obtainable. The process, as pointed out, presents the decided advantage of being operable upon different types of rosin source material to produce uniform or standardized grades of rosin of improved properties.

While preferred embodiment of the invention has been described it is to be understood that this is given to exemplify the underlying principles involved and not as limiting the useful scope of the invention to the particular treatments described.

We claim:

1. The process of securing a plurality of rosin fractions from resins having fractions insoluble in liquefied hydrocarbons from a solution of rosins dissolved in liquefied, normally gaseous paraffin hydrocarbons comprising warming the solution until a rosin phase appears, separating the rosin phase from the hydrocarbon phase, raising the temperature of the hydrocarbon phase until a second rosin phase appears, separating the second rosin phase from the hydrocarbon phase and repeating the cycle until substantially all the rosin has been separated from the hydrocarbon phase.

2. The process of refining rosin which comprises dissolving the rosin in a liquefied, normally gaseous paraffin hydrocarbon, heating the solution to predetermined states of elevated temperatures at which rosin fractions precipitate from the solution to form a separate rosin phase and removing from the solution the several rosin phases which form respectively at the said temperature stages.

3. The process of refining rosin which comprises dissolving rosin in liquefied propane, heating the propane solution to predetermined stages of elevated temperature at which rosin fractions precipitate from the propane solution, as a separate liquid phase removing from the solution the separate rosin phases which form respectively at said temperature stages.

4. The process of refining rosin which comprises dissolving rosin in liquefied propane, raising the temperature to approximately 70° C. to effect a precipitation of predetermined constituents of the rosin insoluble in the propane at such temperature, separating the precipitated material, warming the solution to a higher temperature to effect precipitation of additional constituents insoluble in the propane at such higher temperature, separating such constituents and recovering the residual rosin constituents from the remaining solution.

5. The process of refining gum rosin which comprises dissolving the rosin in a liquefied, normally gaseous paraffin hydrocarbon, heating the solution to predetermined states of elevated temperatures at which different rosin fractions are precipitated as substantially immiscible liquid phases and removing from the solution the several rosin phases which form respectively at the said temperature stages.

6. The process of refining wood rosin which comprises dissolving the rosin in a liquefied, normally gaseous paraffin hydrocarbon, heating the solution to predetermined states of elevated temperatures at which different rosin fractions are precipitated as substantially immiscible liquid phases and removing from the solution the several rosin phases which form respectively at the said temperature stages.

7. The process of refining tall oil rosin which comprises dissolving the rosin in a liquefied, normally gaseous paraffin hydrocarbon, heating the solution to predetermined states of elevated temperatures at which rosin fractions are precipitated as substantially immiscible liquid phases and removing from the solution the several rosin phases which form respectively at the said temperature stages.

8. A method of producing refined rosin which comprises dissolving rosin, which contains color bodies, in liquid propane in the ratio of approximately 1 part of rosin to from 10 to 15 parts of propane, raising the temperature to substantially 70° C. to effect the formation of a second lower liquid phase containing color bodies and some rosin, removing the solvent phase containing dissolved constituents of rosin and recovering such constituents from the solvent.

9. A method of refining rosin which comprises dissolving rosin, which contains color bodies, in a liquefied, normally gaseous paraffin hydrocarbon and elevating the temperature to a degree sufficient to form a second liquid phase containing undesired color constituents and some rosin, separating such second liquid phase and recovering the residual rosin constituents from the hydrocarbon solution.

10. A method of refining rosin which comprises dissolving rosin in liquid propane, elevating the temperature to a point above 70° C., separating a lower liquid phase which forms at such temperature and recovering a clarified rosin from the remaining solution.

11. A method of refining rosin which comprises dissolving rosin, which contains color bodies, in a liquefied, normally gaseous paraffin hydrocarbon, heating the solution to a temperature above the maximum solubility temperature for color bodies and certain rosin constituents and to insure the formation of a separate lower liquid phase containing insolubilized constituents of the rosin, separating the phases thus formed, recovering a clarified rosin from the upper phase, and treating the lower phase to further fractionate its contained rosin constituents.

12. In the refining of rosin that improvement which comprises dissolving the rosin, which contains color bodies, in a liquefied normally gaseous hydrocarbon solvent of the type in which the rosin and naturally occurring associated color bodies are more soluble at lower than at higher temperatures of the solvent and in which the solubility of the color bodies decreases more rapidly than the solubility of the rosin with elevation of temperature of the solvent, then raising the temperature of the system to that predetermined degree at which the desired decolorizing action is achieved as represented by the insolubilizing of the color bodies and some rosin and then accumulating such color bodies in a lower stratified liquid phase while a substantial proportion of the rosin is retained in solution in the stratified upper phase, then separating such lower phase and recovering a rosin fraction of predetermined color characteristics from the upper solvent phase.

13. A process according to claim 12 in which the separated lower phase is redissolved in the said solvent with subsequent elevation of the temperature of the solvent to further fractionate the contained rosin-like constituents.

14. A process in accordance with claim 12 in which the upper phase is further elevated in temperature to further fractionate its contained rosin-like constituents by selective thermal insolubiliziation in the same liquid system.

15. The process of refining rosin which comprises dissolving rosin, which contains color bodies, in liquefied propane in a continuous countercurrent extraction system, heating the propane solution in the system to a temperature at which two liquid phases are formed the temperature being such that the color bodies and a minor fraction of the rosin are insolubilized and accumulate in the lower liquid phase, continuously separating the two liquid phases and recovering the solvent associated with each phase.

16. The process of refining rosin which comprises dissolving rosin, which contains color bodies, in a liquefied normally gaseous paraffin hydrocarbon in a continuous countercurrent extraction system, heating the hydrocarbon solution in the system to a temperature at which two liquid phases are formed the temperature being such that the color bodies and a minor fraction of the rosin are insolubilized and accumulate in the lower liquid phase, continuously separating the two liquid phases and recovering the solvent associated with each phase.

ARTHUR W. HIXSON.
RALPH MILLER.

REFERENCES CITED

The following references are of record in the file of this patent:

UNITED STATES PATENTS

| Number | Name | Date |
|---|---|---|
| 1,762,785 | Little | June 10, 1930 |
| 1,806,973 | Humphrey | May 26, 1931 |
| 2,054,432 | Lister | Sept. 15, 1936 |
| 2,117,572 | Rankin | May 17, 1938 |
| 2,142,592 | Waligora | Jan. 3, 1939 |

OTHER REFERENCES

Humphrey, Trans. Instit. of Chemical Engineers (London), vol. 9 (1930), pages 40 to 45.